Dec. 9, 1969 H. E. NATALIS ET AL 3,483,449

ADJUSTABLE CAPACITOR

Filed May 24, 1968 2 Sheets-Sheet 1

*INVENTOR.*
LAURENCE B. GRADY
HERBERT T. NATALIS

INVENTOR.
LAURENCE B. GRADY
HERBERT T. NATALIS

United States Patent Office 3,483,449

Patented Dec. 9, 1969

1

3,483,449

ADJUSTABLE CAPACITOR

Herbert E. Natalis, Matawan, and Laurence B. Grady, Long Branch, N.J., assignors to Electronic Associates, Inc., Long Branch, N.J., a corporation of New Jersey Filed May 24, 1968, Ser. No. 731,811
Int. Cl. H01g *5/16*
U.S. Cl. 317—249 2 Claims

ABSTRACT OF THE DISCLOSURE

An adjustable electrical capacitor comprising a rolled capacitor section mounted within a casing with a pressure plate and a pressure pad mounted between the walls of the casing and the rolled capacitor section so that pressure on the plate contacts the walls of the capacitor thereby varying the capacitance of the device.

This invention relates to an adjustable electrical capacitor.

The capacitor of the present invention affords superior resistance to vibration, shock, moisture, and insulation breakdown over prior adjustable capacitors. In addition the temperature coefficient characteritsics of the capacitor may be varied over its expected operating range by suitable selection of materials having complementary temperature coefficients of expansion.

It is an object of the present invention to provide an adjustable capacitor of simple construction.

A further object is the provision of a capacitor having an adjusting mechanism of high structural integrity and strength.

Another object of the invention is an electrical capacitor having a nearly linear temperature response characteristic over its expected operating range.

Another object of the invention is an electrical capacitor having a very low temperature response.

Another object of the invention is the provision of an adjustable capacitor having very high mechanical, and therefore, electrical stability so that deviation from set values is on the order <.05%.

These as well as other objects of the invention will become apparent from a reading of the following specification as referenced to the drawings in which.

In brief, the capacitor of the present invention employs a substantially rectangular housing having a threaded aperture for an adjusting screw mounted centrally in one corner of the housing. A pressure plate of high structural integrity is located beneath said aperture and in contiguous relation to the interior walls of the housing. A pressure pad is located in contiguous relation to the interior corner of the housing opposite the location of the pressure plate. An hermetically sealed rolled capacitor section is mounted between the pressure plate and the pressure pad. All materials used are chosen to have complementary thermal coefficients of expansion.

2

Figure 1:
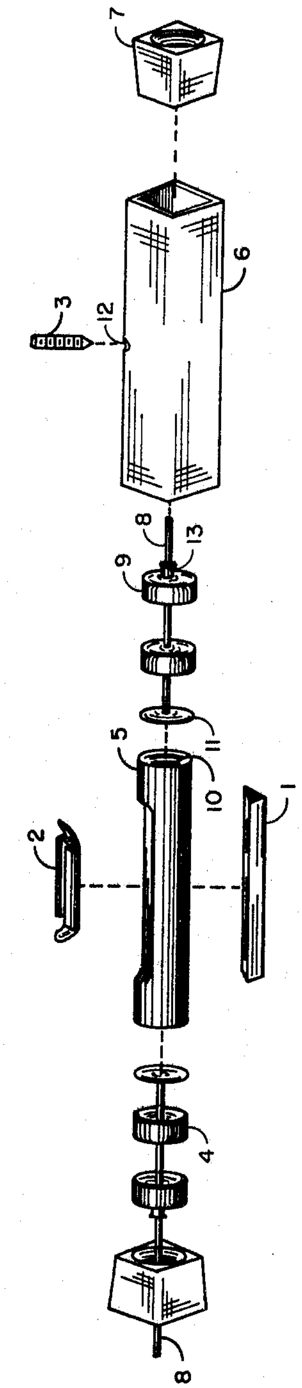
FIGURE 1 is an exploded view of the adjustable capacitor of the invention.

In FIGURE 1, silicon rubber pressure pad 1 is mounted on one side of brass tube 5 which houses capacitor section 10. Pad 1 may also be formed of plastic or other material having the desired thermal coefficient of expansion. Pressure plate 2 is mounted on tube 5 on the opposite side of pressure pad 1. Electrical leads 8 having pigtail portions 11 are affixed as by soldering portions 11 to opposite ends of capacitor section 10. Insulating sections formed of a heat resistant plastic film are mounted on leads 8 between end seals 9 and lead wire termination portions 11. This entire assembly is mounted in housing 6 by frictional engagement between tube 5 and the inner walls of insulating nylon end caps 7 whose outer walls engage the inner surface of housing 6. Mounting within housing 6 is at such position that pressure plate 2 is under threaded aperture 12. Screw 3 is then inserted in aperture 12. Thus, adjustable capacity is obtained by the amount of force applied by screw 3 on pressure plate 2.

Figure 2:
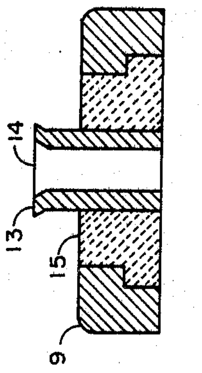
FIGURE 2 is a section view of the end seal employed with the invention.

FIGURE 2 is a detailed section view of end seal 9. This seal is formed of compressed glass or ceramic for good hermetic properties. Seal 9 has ferrule portion 13 having an aperture 14 therein which aperture houses leads 8. Ferrule 13 serves to control excess solder flow during final assembly. End seal 9 has a glass filled section 15 therein. Seal 9 engages insulating sections 4 and thereby, lead wire termination portions 11.

Figure 3:
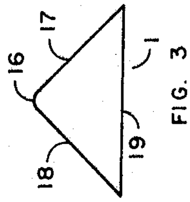
FIGURE 3 is an end view of the pressure pad used with the invention.

FIGURE 3 shows an end view of pressure pad 1. This pad is constructed of a material which has a temperature coefficient of expansion to complement that of the pressure plate 2, casing 5, and housing 6. Because of the materials used in the principal embodiment, pad 1 is made of a silicon rubber of a high durameter, though other materials may be useful in the present invention. As shown in FIGURE 3, pad 1 is roughly triangular in shape. This shape is governed by the interior wall configuration of housing 6 which is generally rectangular as will be apparent by inspection of FIGURE 6. In practice, portion 19 of pad 1 is contiguous with tube 5 while portions 17 and 18 are contiguous with two interior walls of housing 6. Rounded portion 16 of pad 1 fits into the rounded junction of those two interior walls.

Figure 5:
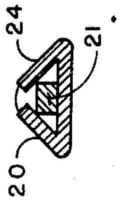
FIGURES 4 and 5 are side and end views, respectively, of the pressure plate employed in the invention.
Figure 4:
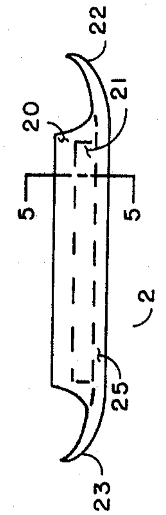

FIGURES 4 and 5 show detailed side and end section views of pressure plate 2. The configuration of the pressure plate gives great strength so that deformation in use is not a problem in the present invention. Pressure plate 2 is formed of two pieces of annealed spring steel: inner bar member 21, and outer support member shown generally at 25. Support member 25 has bent up end portions 22 and 23 and bent over side portions 20 and 24. Side portions 24 serve two purposes: the inner portions of members 20, 24 hold bar 21 tightly in place, while providing properly configured mating surfaces for the substantially rectangular inner wall configuration of housing 6. The space between the ends of bent up portions 20 and 24 permits direct engagement of screw 3 onto bar 21. Thus, forces are distributed among bar 21 and the bent portions of support 25 to retain complete strutcural integrity of the pressure plate throughout its useful life.

Figure 6:
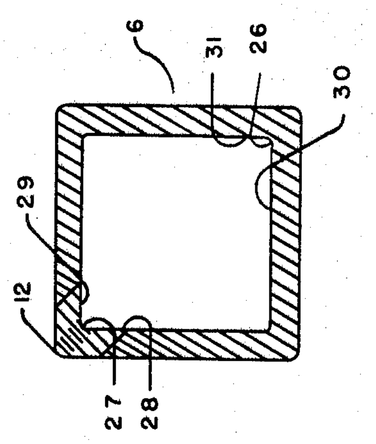
FIGURE 6 is an end view of the capacitor housing of the invention.

FIGURE 6 is an end view of housing 6. This housing, in practice, is formed of seam welded steel. Threaded aperture 12 is shown centered on one corner of rectangular housing 6. This location provides excellent structural integrity for housing 6 since the corners of the housing 6 have much less tendency to deform than the walls of the housing. In practice, portions 20 and 24 of pressure plate 2 will mount contiguously with walls 28 and 29, respectively, of corner 27, while portions 17 and 18 of pressure pad 1 will be contiguous with walls 30 and 31, respectively, of corner 26.

Figure 7:
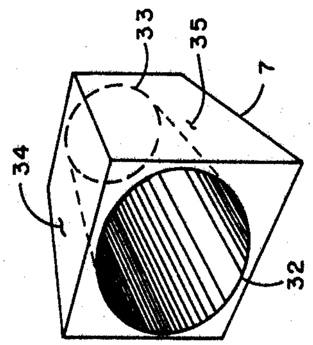
FIGURES 7 and 7A are isometric and section views of the end cap used in the invention.
Figure 7A:
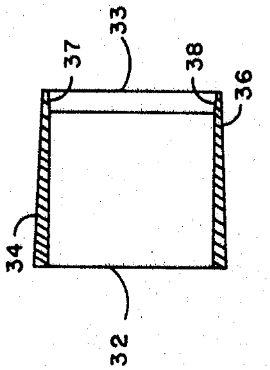

FIGURE 7 is a detailed view of end cap 7 which, in practice, is formed of nylon. Cap 7 has different diameter apertures 32 and 33 at opposite ends thereof as shown in FIGURE 7A creating tapered inner surfaces 37 and 38. In addition, all sides of cap 7, of which only sides 34, 35 and 36 are shown, are tapered in the direction from aperture 32 to aperture 33. In practice, large aperture 33 is press fit over tube 5 when end cap 7 is pressed into casing 6. The tapered outer walls of cap 7 permit tight engagement in housing 6 while the tapered inner walls ensure tight engagement of cap 7 over capacitor housing 5.

Rolled capacitor section 10 is of a standard construction used in the industry. Section 10 consists of a rolled configuration of two layers of aluminum foil separated by a polystyrene insulating layer. After completion of the rolled section, silicon rubber tape is placed over the entire section to compensate, by nulling out, the temperature coefficient of expansion of the polystyrene insulating layer. Mylar tape is then placed over the silicon tape to hold the silicon tape in place and provide a slick surface. The lead wire or termination portions of the electrical leads are then affixed to the ends of the rolled section by an appropriate solder composition. After the leads are affixed. the capacitor section is inserted in tube 5 which, before sealing, is evacuated and filled with an inert gas as is a standard practice in the art.

Figure 8:
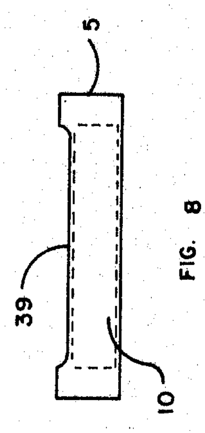
FIGURE 8 shows a side view of tube and capacitor section used in the present invention.

To ensure proper contact between pressure plate 2 and the capacitor tube section 5, the tube 5 may be "dimpled" which involves causing a depression in tube 5 having a configuration roughly matching that of pressure plate 2 as shown by numeral 37 in FIGURE 8.

Now that the principal embodiment of the invention has been described, it is apparent that many modifications may be made therein without departing from the scope thereof so that the description is to be construed as illustrative and not in a limiting manner.

We claim:

1. An adjustable capacitor comprising:

a rectangular housing having an aperture centrally located in one corner thereof, a rolled capacitor section within said housing, a pressure plate located between said housing and said section beneath said aperture, a pressure pad mounted between said housing and said section opposite said plate, said section being deformed to a configuration similar to said plate, adjusting means located in said aperture whereby said adjusting means contacts said plate thereby varying the pressure on said section, said pressure plate having a generally triangular configuration and includes a bar member located between the sides of said triangle, said bar member adapted to contact said adjusting means ensuring slight srtuctural deformity of said plate.

2. The adjustable capacitor of claim 1 wherein said pressure pad has a configuration generally matching that of an interior corner of said housing.

References Cited

UNITED STATES PATENTS

| | | | |
|---|---|---|---|
| 3,119,955 | 1/1964 | Desrosiers | 317—249 |
| 3,185,903 | 5/1965 | Genovese | 317—249 |

FOREIGN PATENTS

| | | |
|---|---|---|
| 192,744 | 2/1923 | Great Britain. |

ELLIOT A. GOLDBERG, Primary Examiner